Aug. 3, 1943.    J. M. NAUL    2,325,915
PERMANENT MAGNET MOTOR
Filed April 13, 1942    2 Sheets-Sheet 1
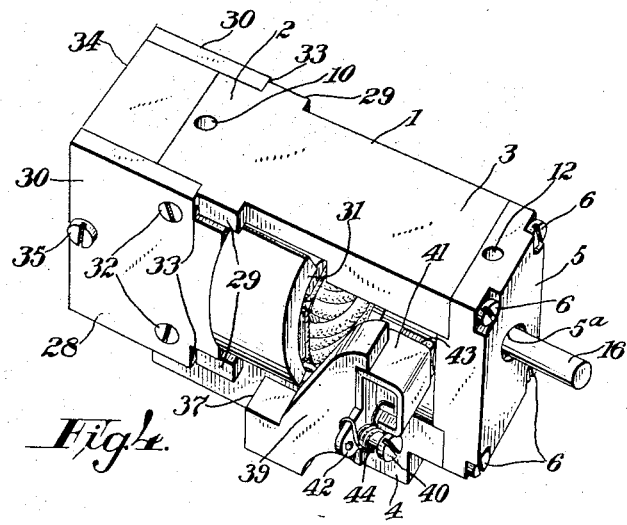
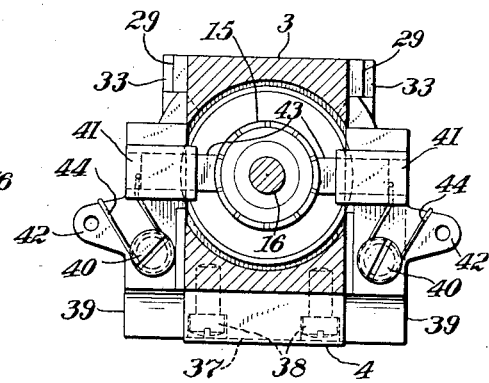
Inventor
James M. Naul
By John F. Heine
Attorney
Witness:
John H. Cave Aug. 3, 1943.   J. M. NAUL   2,325,915
PERMANENT MAGNET MOTOR
Filed April 13, 1942   2 Sheets-Sheet 2

Witness:
John H. Cave

Inventor
James M. Naul
By John F. Heine
Attorney

Patented Aug. 3, 1943

2,325,915

UNITED STATES PATENT OFFICE 2,325,915

PERMANENT MAGNET MOTOR

James M. Naul, Fanwood, N. J., assignor to The Singer Manufacturing Company, Elizabeth, N. J., a corporation of New Jersey Application April 13, 1942, Serial No. 438,674

13 Claims. (Cl. 172—36)

This invention relates to direct-current motors, particularly of the separately-excited type in which small permanent magnets are used to supply the field flux.

More particularly, the invention is concerned with lightweight motors of very small size especially adapted for service which requires frequent reversals of rotation and for locations where space and weight are important factors.

As an indication of the size of motor with which I am concerned, a motor built according to the invention has outside housing dimensions of approximately one inch in width, one inch in height, and one and seven-eighths inches in length, and a rotor diameter of about one half of one inch. In motors of this size the space and weight requirement of the terminals alone may be considerable relative to the entire motor. This relation is aggravated in the case of conventional direct-current motors in which four terminals must be provided so that the armature winding may be externally connected reversely relative to the field winding to reverse the direction of rotation of said motor.

It is an object of this invention, therefore, to provide a small, compact, lightweight direct-current motor having only two external connection terminals and being readily reversible in rotation by reversing the polarity of the applied voltage.

A further object of this invention is to provide a small, reversible direct-current motor having a small permanent magnet for supplying the field flux, including provision for the ready replacement of said magnet without removal of the rotor or disturbance of the bearing alignment or initial air gap concentricity.

With the above and other objects in view as will hereinafter appear, the invention comprises the combination and arrangement of parts hereinafter set forth and illustrated in the accompanying drawings of a preferred embodiment of the invention and the advantages attained thereby will be ready understood by those skilled in the art.

In the accompanying drawings:

Fig. 1 is an enlarged longitudinal sectional view taken through an improved motor embodying the invention.

Fig. 2 is a bottom plan view of the motor shown in Fig. 1.

Fig. 3 is a vertical section taken substantially on line 3—3, Fig. 1.

Fig. 4 is a perspective view of the improved motor.

Figure 5:
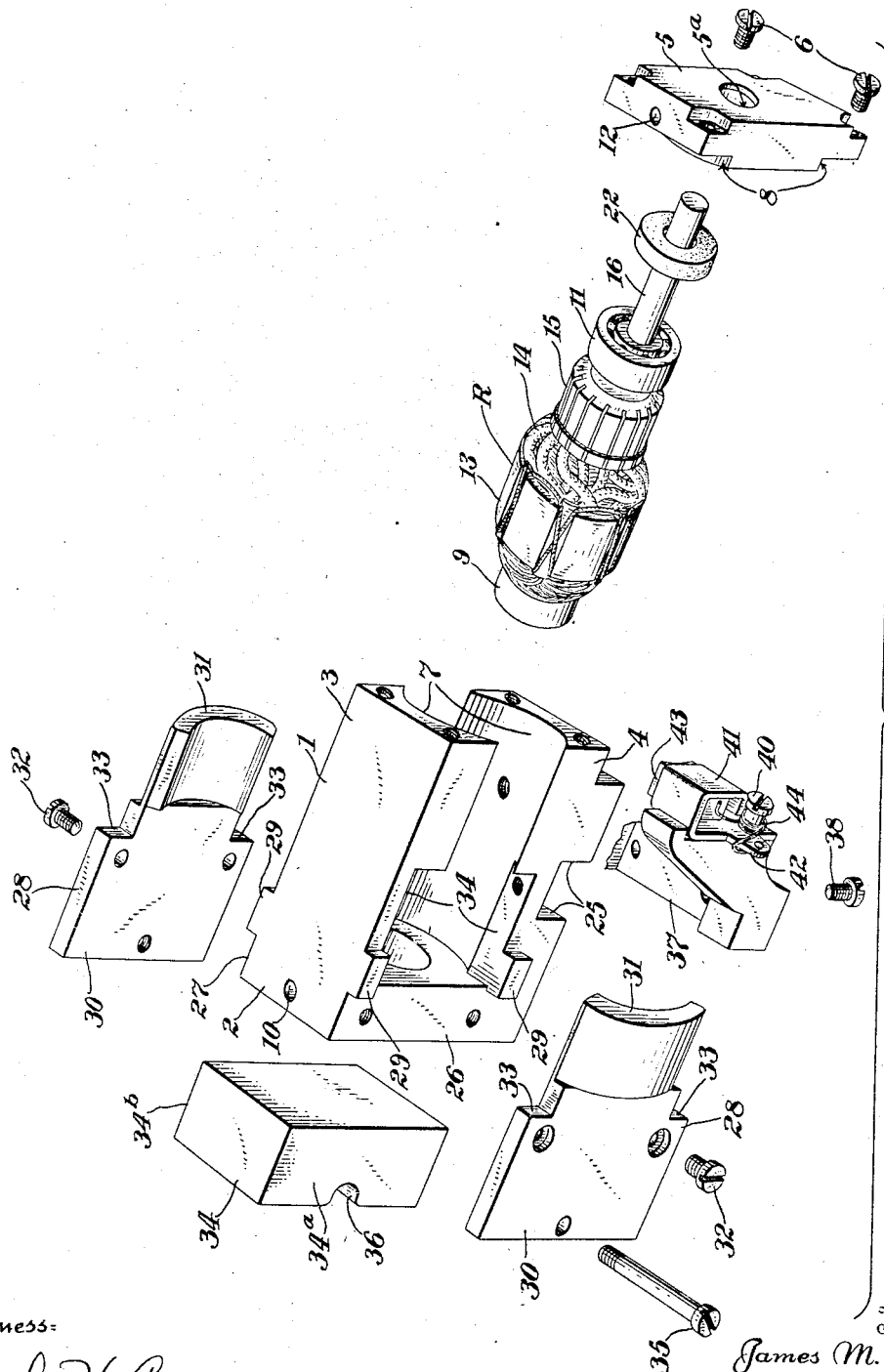
Fig. 5 is a disassembled perspective view of the motor.

Referring more specifically to Fig. 1, there is shown an electric motor comprising a U-shaped frame 1 of non-magnetic material such as aluminum preferably formed by a die-casting process and having a block-like body portion 2 and spaced-apart parallel limb portions 3 and 4 adjoining said body portion. A block-like end-cover 5 of non-magnetic material is secured to the free ends of limb portions 3 and 4 by means of screws 6 and forms with said frame member 1 a partially closed housing within which is positioned a rotatable armature member R. The limb-portions 3 and 4 are formed with inner face portions 7 which conform to the peripheral shape of the armature R as may be seen best in Fig. 3. The end-cover 5 is formed with peripheral shoulder portions 8 which provide locating surfaces against which the face portions 7 may be seated. Within the body portion 2 is located a bearing-receiving recess 9 which communicates with the exterior through a radial oil duct 10. Similarly, within the end-cover 5 is located a bearing-receiving recess 11 and a radial communicating oil duct 12.

The rotatable armature R is of conventional construction and comprises a laminated magnetic core 13 to which is applied a winding 14 connected to the commutator 15. The core 13 and commutator 15 are secured to a shaft 16 by a press fit onto a straight-knurled portion thereof. Insulation end-pieces 17 and collars 18 are employed to insulate the winding 14 from metallic parts of the rotor. Anti-friction bearings 19 pressed onto each end portion of shaft 16 are seated within recesses 9 and 11 and are provided with thin, flexible disc seals 20 to prevent oil leakage through the bearings to the interior of the housing. Felt washers 21 and 22, are positioned adjacent the ball-bearings 19 within the respective recesses 9 and 11 to provide oil reservoirs which maintain a supply of lubricating oil for the bearings. The end-cover 5 is provided with an aperture 5ª through which extends an end portion of the shaft 16.

Thus far, I have described a partially closed non-magnetic housing with a rotatable armature journaled within said housing. It is to be noted that all additional parts needed to complete an operative motor are secured to the outside of the housing and do not require for their assembly any displacement or disarrangement of the parts thus far described.

The limb portion 4 is radially thicker than the limb portion 3 and is provided with tapped holes 23, 24 adapted to receive motor-mounting screws (not shown). A transverse slot 25, as seen in Fig. 5, is provided in the limb 4 for receiving a brush assembly later to be described herein.

The body portion 2 is formed with two finished plane parallel surfaces 26, 27 (Fig. 5), which serve as accurate locating surfaces to provide proper spacing and alignment for pole-pieces 28. Ear portions 29 are extended laterally from the limb portions 3 and 4 to provide guiding and locating surfaces to facilitate the proper positioning of plate-like pole-pieces 28. These pole-pieces, as seen best in Fig. 5, are formed from low-reluctance magnetic material and present flat rectangular body portions 30 at one end and pole-face portions 31 at the other end which are transversely curved to conform to the periphery of the armature core 13. The two pole-pieces 28 are secured in intimate face-to-face contact with the surfaces 26 and 27 respectively, by means of headed screws 32 which extend through the pole-pieces and are threaded into the body portion 2 of the frame 1. Furthermore, the pole-pieces are notched to provide shoulder portions 33 which cooperate with the ear portions 29 to accurately position the pole-pieces 28 relative to the axis of the rotatable armature R in order to provide a concentric air gap between said pole-pieces and the core 13. Slotted portions 34 of the frame 1 define diametrically opposed windows through which project the pole-face portions 31 of the pole-pieces 28 whereby to more intimately and completely embrace the core portion 13 of the armature R and to form therewith an air gap of sufficiently low reluctance. It is of course contemplated that the pole pieces 28 may be secured in the frame 1 in other suitable ways as, for example, by direct insertion within the die-cast metal during the casting of the frame itself, in which case fastening screws 32 are unnecessary.

The closing link in the magnetic field circuit is provided by a small block-shaped permanent magnet 34 preferably made from an aluminum, nickel, cobalt, iron alloy, known generally in the trade as "Alnico," and employed herein to furnish the field flux for the motor. This material is particularly well suited for this application due to its high magnetizing force as well as its ability to retain its magnetism, even under adverse conditions. The permanent magnet 34 is formed so that the two opposite faces 34a and 34b present opposite magnetic polarities. These faces are ground plane and parallel and are positioned to form with surfaces 26 and 27 respectively opplanar surfaces of considerable extent which receive in intimate face-to-face contact the body portions 30 of the pole-pieces 28 as seen best in Figs. 2 and 4. A non-magnetic draw bolt 35 extends through one pole-piece body, lies within an external groove 36 formed in the permanent magnet 34, and is threaded into the opposite pole-piece body. By drawing up this bolt 35 the permanent magnet is clamped securely between the pole-pieces to form tight joints having a minimum magnetic reluctance. The groove 36 may be readily provided for in the magnet casting and requires no further finishing. The curved pole-face portions 31 of the pole-pieces 28, due to their arched form, are highly resistant to deflections in a radial direction, which is an important consideration in maintaining a fixed air gap. The body portions 30 are slightly deflected inwardly to grip the magnet when the draw bolt 35 is tightened but this deflection does not appreciably effect the pole-face portions because of the extensive supporting area provided by the plane parallel surfaces 26 and 27 of the frame 1. Further, the draw bolt 35 may be omitted entirely and the magnet held between pole-pieces 28 by a tight push fit.

It is seen that the U-shaped field magnet built up from the permanent magnet 34 and the pole-pieces 28 embraces the body portion 2 of the frame 1 and is positioned with the long dimensions of the pole-pieces parallel to the axis of the rotatable armature. This arrangement provides a simple and compact structure in which the pole pieces cooperate with the frame to form a partial closure for the armature. It is clear that by positively securing the pole-pieces against the extensive coplanar surfaces provided jointly by the housing and the magnet, as described, the air gap is held rigid and constant thereby providing a motor which maintains uniform performance over long periods of use.

The brush-holder assembly comprises a U-shaped yoke 37, preferably made of molded insulating material, removably secured within the slot 25 to the limb 4 by means of screws 38, and formed with upstanding limbs 39 which are positioned on either side of the limb 4 and embrace the commutator 15 in radially spaced relation. Secured to these limbs 39 by means of shouldered screws 40 are conducting brush boxes 41 formed integrally with connector lugs 42. It is to be noted that these lugs 42 provide the necessary connecting means without adding appreciably to the weight or space requirement. Brushes 43 positioned within the brush-boxes, are held radially and resiliently against the commutator 15 by means of helical wire springs 44 which press down on top of the brushes, and which are wound around the shanks of screws 40 and are hooked over the connector lugs 42 as seen best in Fig. 3.

It is important that the magnetic circuit for the field flux comprising the permanent magnet and associated pole-pieces have a low magnetic reluctance in order to utilize the permanent-magnet material most efficiently. This is effected by making the contacts at the joints between planar surfaces of pole-piece and magnet of sufficient area and by supplying sufficient clamping pressure at said joints. Further, it is of advantage, to keep the shape of the permanent magnet as simple as possible in order to avoid difficult castings and to require only a minimum of finishing. This is especially true of high-grade permanent magnet materials such as "Alnico" which is notoriously difficult to machine. Accordingly, I have provided a magnetic circuit which uses as a flux source a small block of high-grade permanent magnet material having only two plane parallel faces which need to be finished ground.

It is evident from this description that the replacement of the permanent magnet 34 requires but the simplest manipulation. Removal of draw bolt 35 releases the magnet which is then removed without any disturbance to or disarrangement of the armature, the pole-pieces or the bearing alignment. A replacement magnet or the same magnet remagnetized is inserted, bolt 35 replaced and tightened, and the motor is ready to run again.

The operation of the motor herein disclosed will be apparent from the foregoing description. It is merely necessary to apply a direct-current voltage of proper magnitude to the connector lugs 42 to energize the motor for rotation. Reverse rotation is easily effected by simply reversing the polarity of the applied voltage.

From the foregoing it will be perceived that I have provided a compact, lightweight permanent magnet motor in which a small block of permanently magnetized material is removably positioned externally of said motor to supply the field flux, including the provision for ready replacement of said permanent magnet without disturbing the armature and bearing alignment.

It will be obvious to those skilled in the art that the invention may, without departure from its essential attributes, be embodied in various specific forms other than that shown and described, which latter is to be considered in all respects as illustrative of the invention and not restrictive; reference being had to the appended claims rather than to the foregoing description to indicate the scope of the invention.

Having thus set forth the nature of the invention, what I claim herein is:

1. A dynamoelectric machine having a non-magnetic frame member including bearing-supporting end portions one of which is integral with said frame, magnetic pole-pieces secured to opposite sides of said frame and projecting beyond one of said end portions and a permanent magnet secured to the projecting end portions of said pole-pieces externally of said frame member.

2. A dynamoelectric machine field structure comprising a frame of non-magnetic material, a pair of plate-like pole-pieces secured to opposite sides of said frame and extending beyond one end thereof, a permanent bar magnet extending between the projecting ends of said pole-pieces, and a draw bolt connecting the projecting ends of said pole pieces for clamping the same upon said bar magnet.

3. An electric motor comprising a frame, bearings carried by said frame, a rotor in the frame journaled in said bearings, a block-shaped permanent magnet having substantially plane parallel ends and positioned externally of the frame with the magnetic axis transverse to the direction of the rotor axis, pole-pieces detachably secured to opposite external faces of said frame and connected to the ends of the permanent magnet.

4. In a dynamoelectric machine having a frame in which is journaled a rotatable armature; a built-up field structure comprising a permanent bar magnet positioned externally adjacent one end of said frame and having substantially plane parallel end faces of opposite polarity which form with opposite surface portions of said frame substantially coextensive coplanar surfaces, pole-pieces positioned in face-to-face contact with said coplanar surfaces and removably secured to said frame.

5. An electric motor comprising a frame formed with external flat sides, bearings carried by said frame, a rotor in the frame journaled in said bearings, a permanent bar magnet having substantially plane parallel ends of opposite polarity and positioned adjacent one end of said frame so that the ends of said magnet are substantially coplanar with the flat sides of said frame, and pole-pieces removably secured to said flat sides and extending longitudinally beyond said frame end to engage the ends of said magnet in surface-to-surface contact.

6. In a dynamoelectric machine having a non-magnetic frame in which is journaled a rotatable armature; a built-up field structure comprising a permanent bar magnet positioned externally adjacent one end of said frame and having substantially plane parallel end faces of opposite polarity which form with surface portions of said frame substantially coextensive coplanar surfaces, pole-pieces positioned in face-to-face contact with said coplanar surfaces and removably secured to said frame, including adjustable clamping means for holding the permanent magnet securely between said pole-pieces.

7. An electric motor comprising a frame formed with external flat sides, bearings carried by said frame, a rotor in the frame journaled in said bearings, a permanent bar magnet having substantially plane parallel ends of opposite polarity and positioned adjacent one end of said frame so that the ends of said magnet are substantially coplanar with the flat sides of said frame, pole-pieces removably secured to said flat sides and extending longitudinally beyond said frame to engage the ends of said magnet in surface-to-surface contact, and clamping means to maintain said contact.

8. An electric motor comprising a non-magnetic frame formed with external flat sides, bearings carried by said frame, a rotor in the frame journaled in said bearings, a permanent bar magnet having substantially plane parallel ends of opposite polarity and positioned adjacent one end of said frame so that the ends of said magnet are coplanar with the flat sides of said frame, pole-pieces removably secured to said flat sides and extending longitudinally beyond said frame to engage the ends of said magnet in surface-to-surface contact, and a non-magnetic draw bolt connecting the extended ends of said pole-pieces for clamping the same upon the permanent magnet.

9. A dynamoelectric machine having a generally rectangular frame member of non-magnetic material with a pair of open opposite sides and a pair of bearing-supporting end members, a rotor journaled in said end members, a pair of plate-like pole-pieces screwed between their ends to one of said frame end portions at the open sides of said frame member, a permanent bar magnet removably secured to said pole pieces externally of said frame member without disturbing the connection between the pole-pieces and the frame end portions.

10. A dynamoelectric machine field structure comprising a frame of non-magnetic material, a pair of plate-like pole-pieces secured to opposite sides of said frame extending beyond one end thereof, a permanent bar magnet extending between the projecting ends of said pole-pieces and formed with an external groove, and a draw bolt connecting the projecting ends of said pole-pieces and disposed in said groove for clamping said projecting ends upon said bar magnet.

11. In a dynamoelectric machine having a non-magnetic housing with diametrically opposed apertures and a rotatable armature journaled in said housing; an external built-up field structure comprising a block-like permanent magnet removably clamped between two opposed plate-like pole-pieces formed at one end with flat body portions and at the other end with cylindrically curved pole-face portions projecting into said opposed apertures and positioned adjacent to the core portion of said armature, said pole pieces being removably secured at the body portions to the exterior of the housing.

12. An electric motor comprising a non-magnetic frame formed with external flat sides, bearings carried by said frame, a magnetic rotor core in the frame journaled in said bearings, a permanent bar magnet having plane parallel ends of opposite polarity and positioned adjacent one end of said frame so that the ends of said magnet are substantially coplanar with the flat sides of said frame, pole-pieces removably secured to said flat sides and extending in one direction longitudinally beyond said frame to engage the ends of said magnet in surface-to-surface contact, and extending in the opposite direction to form pole-face portions positioned to partially embrace the rotor core.

13. An electric motor comprising a generally rectangular frame, bearings carried by said frame, a magnetic rotor core in the frame journaled in said bearings, a block-shaped permanent magnet positioned externally of the frame with the magnetic axis transverse to the direction of the rotor axis, pole-pieces detachably secured intermediate their ends to opposite faces of said frame and connected at one end to the ends of the permanent magnet, terminating at the opposite end in pole-face portions which partially encompass the rotor core.

JAMES M. NAUL.